Feb. 21, 1967  S. LINDEN  3,305,265
CAR SEAT
Filed Oct. 23, 1965
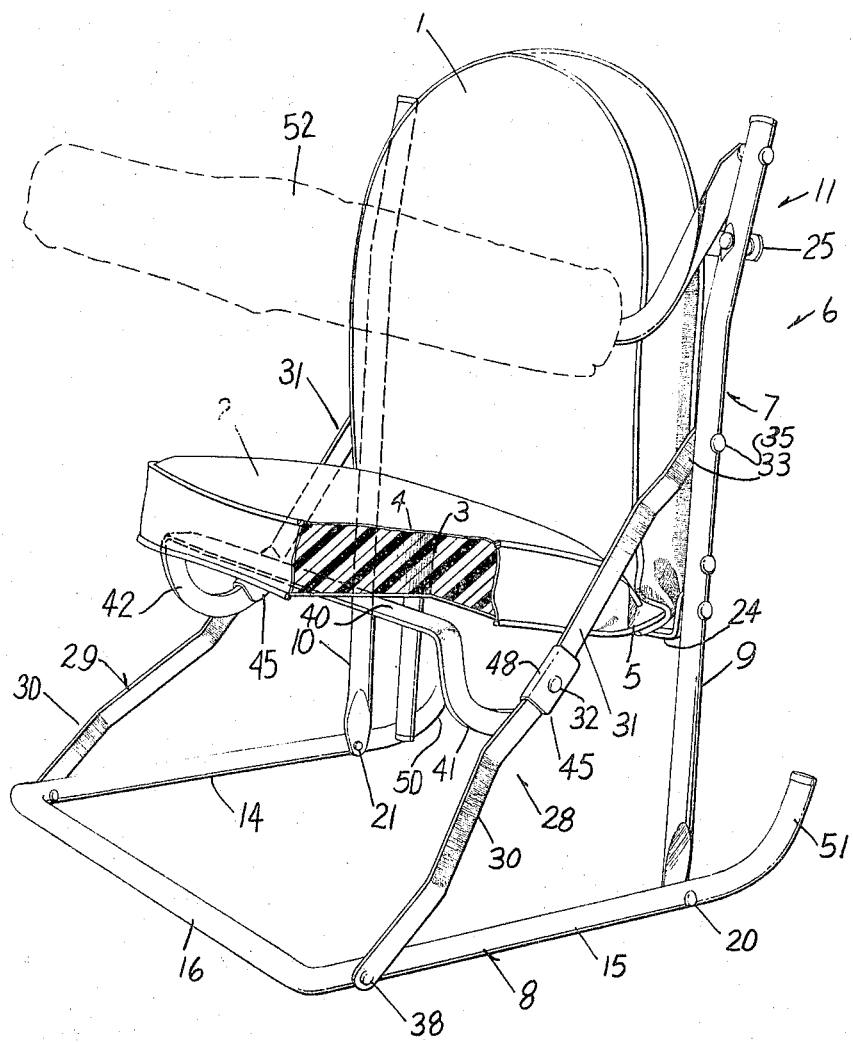
INVENTOR
SAMUEL LINDEN
BY Wolf, Greenfield & Hieken
ATTORNEY

United States Patent Office 3,305,265
Patented Feb. 21, 1967

3,305,265
CAR SEAT
Samuel Linden, Swampscott, Mass., assignor to Bunny Bear, Inc., Everett, Mass., a corporation of Massachusetts
Filed Oct. 23, 1965, Ser. No. 503,344
9 Claims. (Cl. 297—353)

The present invention relates to a child's seat and more particularly to a child's seat adapted to be secured to an automobile seat.

Heretofore available collapsible child's car seats have been made with a back rest and seat rest pivotally interengaged. The seat rests are normally supported by a separate U-shaped wire member that is separately secured to the frame and is adapted to pivot downwardly under the seat rest when the seat is set up in a car. This type of construction is not altogether satisfactory, especially in child's car seats of the type that are secured to the automobile seat by engaging the bottom of the back rest of the automobile seat. The problem that arises in this prior art type of construction is that the child's car seat requires the separate adjustment of the hinge members as well as this U-shaped wire member when it is being installed in a car. This may be difficult and awkward especially if one has to contend with a child or infant while installing a seat of this nature.

It is an object of the present invention to overcome difficulties such as these by providing a car seat construction which is simpler to install and remove. It is also an object of this invention to provide a construction which is simpler, more efficient, less expensive, and less likely to require repair.

These and other objects of this invention will be more clearly understood when considered in connection with the accompanying drawing which is a perspective, fragmentary illustration of a child's car seat embodying the invention.

The car seat illustrated is designed for use by a child and is intended to be secured to the front seat of a car by hooking or engaging the front seat of the car between the car backrest and seat rest. However, the invention may be used in connection with other types of car seats, including, for example, those that hook over the top of the backrest.

In this illustrated embodiment, the back rest 1 and seat rest 2 may be conveniently formed as, for example, with a foamed rubber or fiber matting interior 3, supported by a rigid base and covered with a fabric or plastic covering 4. If desired, the back rest 1 and seat rest 2 may be integrally connected to one another by the covering 4 at their adjacent edges to form a hinge line 5 so that the back rest and seat rest may pivot to and from a position substantially normal to one another.

A frame 6 comprises a back member 7 and base member 8. The back member 7 comprises a pair of parallel tubular members 9 and 10, similar to one another. The upper ends of these tubular members 9 and 10 are rearwardly flared, as illustrated at 11. The lower ends of these tubular members 9 and 10 are pivotally secured to the sides 14 and 15 of the base member 8 at pivots 20 and 21. A bight section 16 integrally interconnects these sides 14 and 15. The sides 14 and 15 and bight section 16 are preferably formed of a single continuous tubular member. The back rest 1 and seat rest 2 are secured to the frame 6 by a plurality of cross braces 24 and 25. These cross braces 24 and 25 are secured at their ends to the tubular members 9 and 10, by suitable means, such as bolts or the like. Cross brace 24 is preferably secured to the back rest and seat at the hinge line 5 by suitable means such as rivets. Cross brace 25 is similarly secured to back rest 1 near its upper end.

Means are provided for locking the back member 7 and base member 8 in the normal position illustrated with the seat rest supported in a position substantially normal to the back rest. This means comprises a pair of parallel and similar hinge members 28 and 29.

These hinge members are positioned on opposite sides of the seat rest 2 and interconnect opposite sides of the base member 8 to the tubular members 9 and 10. Each hinge member comprises a pair of legs 30 and 31, hinged together at adjacent ends by pin 32, with the other end 33 of one leg 31 pivotally engaged with the tubular member of back member 7 by a suitable pivot pin 35 or the like. The other end of the other leg 30 is pivotally engaged by a suitable pivot pin 38 to the side of base member 8. The legs 30 and 31 are formed with offset portions. The portions of these legs close to their adjacent ends are parallelly offset from the more remote portions in a direction toward the seat rest 2, as illustrated.

The seat rest 2 is supported by support means which extends transversely of and is adapted to engage the lower surface of and support seat rest 2. This support means comprises a bar 40 having ends integrally and rigidly connected to legs 31 of each hinge member through arcuate sectors 41 and 42. Preferably both legs 31, both arcuate sectors 41, 42 and the bar 40, are formed of continuous flat stock with the width of the stock in the bar 40 perpendicular to the width of the stock in the legs 31 and arcuate sectors 41, 42.

Locking means for locking the legs 30 and 31 in fixed relation is provided by a U-shaped member 45. This U-shaped member has opposite arms interconnected by a bight portion 48. This bight portion 48 extends across an edge of each of legs 30 and 31 at the adjacent legs with the arms pivotally secured by pin 32 to the outer sides of the hinged-together legs.

The sides 14 and 15 are provided with upwardly flared ends 50 and 51 at their rear ends. These flared ends form hooks or the like and are adapted to hook under an automobile back rest along a line intermediate the back rest and seat rest of the automobile.

The car seat is also provided with a conventional safety bar 52 pivotally secured to the frame at its ends. If desired, this safety bar may be padded, as illustrated.

What is claimed is:
1. A child's seat for use in an automobile comprising
    a back rest and seat rest, means interengaging said back rest and seat rest for movement of said back rest and seat rest to and from a position substantially normal to one another,
    a frame including a back member and a base member, means pivotally interengaging said back member and base member for movement to and from a position substantially normal to one another,
    means securing said back rest in substantial parallel relation to said back member,
    means for locking said back member and base member in said normal position and supporting said seat rest in a position substantially normal to said back rest comprising a pair of hinge members positioned one on either side of said seat rest and each including a pair of legs hinged together at adjacent ends with the other end of one leg pivotally engaging said back member and the other end of said other leg pivotally engaging said base member,
    support means integral with one of said legs extending transversely of and adapted to engage and support said seat rest, and
    means for locking said legs in fixed relation to one another.
2. A child's seat as set forth in claim 1 wherein said support means comprises a bar having ends integrally and rigidly connected to corresponding legs in each of said hinge members with the intermediate portion of said bar adapted to engage the bottom of said seat rest.

3. A child's seat as set forth in claim 2 wherein said bar is integrally connected at its ends to said one leg of said hinge members.

4. A child's seat as set forth in claim 3 having a pair of arcuate sectors with each sector having ends integral and continuous with said adjacent end of said one leg of said hinge members and with an end of said bar.

5. A child's seat as set forth in claim 4 wherein said means for locking said legs in fixed relation comprises a member having a U-shaped configuration comprising arms and a bight portion, said bight portion extending across an edge of said legs at said adjacent ends with said arms pivotally secured to the outer sides of said hinged-together legs.

6. A child's seat as set forth in claim 5 wherein said base member comprises a tubular elongated member having sides and a bight interconnecting said base member sides, and with said other legs pivotally engaging said base member sides.

7. A child's seat as set forth in claim 6 wherein said back member comprises tubular members pivotally secured one to each of said base member sides.

8. A child's seat as set forth in claim 7 wherein said back member includes a plurality of cross braces extending across said back rest and interconnecting said back member tubular elements.

9. A child's seat as set forth in claim 8 wherein said legs are each formed with offsetting portions and with said adjacent ends of said legs offset with respect to the remaining portions of said legs inwardly toward said seat rest.

References Cited by the Examiner
UNITED STATES PATENTS

| | | | |
|---|---|---|---|
| 261,637 | 7/1882 | Sriver | 297—32 |
| 2,238,817 | 4/1941 | Morgan et al. | 297—58 |
| 3,047,333 | 7/1962 | Stanimir | 297—32 |
| 3,170,727 | 2/1965 | Peterson | 297—253 |
| 3,231,053 | 1/1966 | Rutkowski | 297—55 |
| 3,245,717 | 4/1966 | Levy | 297—254 |
| 3,262,736 | 7/1966 | Merelis | 297—253 |

FRANK B. SHERRY, *Primary Examiner.*

FRANCIS K. ZUGEL, *Assistant Examiner.*